United States Patent [19]

Santhanam et al.

[11] 4,278,539
[45] Jul. 14, 1981

[54] METHOD FOR REMOVING HEAVY METALS FROM AQUEOUS LIQUIDS

[75] Inventors: Chakra J. Santhanam, Lexington; Ravindra M. Nadkarni, Arlington, both of Mass.

[73] Assignee: Arthur D. Little, Inc., Cambridge, Mass.

[21] Appl. No.: 940,837

[22] Filed: Sep. 8, 1978

[51] Int. Cl.$^2$ ............................ C02B 1/26; C02C 5/02
[52] U.S. Cl. ..................................... 210/724; 210/726; 423/48; 423/101
[58] Field of Search ........................ 210/45, 51–53; 23/305 R; 423/37, 42, 48, 101, 140

[56] References Cited

U.S. PATENT DOCUMENTS

| | | | |
|---|---|---|---|
| 3,740,331 | 6/1973 | Anderson et al. | 210/53 |
| 3,872,222 | 3/1975 | Barnes | 23/305 X |
| 3,980,752 | 9/1978 | Fekete et al. | 423/140 X |
| 4,073,860 | 2/1978 | Huggins et al. | 423/101 X |
| 4,102,784 | 7/1978 | Schlauch | 210/53 X |

Primary Examiner—Thomas G. Wyse

[57] ABSTRACT

Method and apparatus for removing heavy metals as sulfides from aqueous liquids. The aqueous liquid is introduced into a circulating liquid loop wherein there are established a mixing zone, a controlled precipitation initiating zone, a crystal growing zone and a crystal settling zone. The aqueous feed liquid containing H$_2$S dissolved therein and at a pH below that at which the sulfide is precipitated is mixed in the loop with a pH-adjusting liquid; and the degree of supersaturation with respect to the metal sulfide is maintained within the controlled precipitation initiating and crystal growing zones in the metastable condition so that the growth rate of the metal sulfide crystals remains greater than under uncontrolled conditions vis-a-vis the nucleation rate to effect the production of metal sulfide crystals of a character which makes it possible to separate them through clarification and filtration.

12 Claims, 4 Drawing Figures

METHOD FOR REMOVING HEAVY METALS FROM AQUEOUS LIQUIDS

This invention relates to the removal of heavy metal ions from aqueous liquids and more particularly to method for processing aqueous liquids to precipitate heavy metal sulfides therefrom in a crystalline form which makes it possible to readily remove them from the liquid by such techniques as settling and filtering.

The requirements for removal of heavy metal ions from waste effluent waters as a form of pollution control are becoming increasingly more stringent; and the desirability, at least from an economic point of view, of recovering even very small amounts of certain of the more valuable metals is becoming more apparent. In either of these general situations, the concentrations of the metal values in the aqueous wastewaters or in the aqueous process solutions are usually relatively low—in some cases of the order of several parts per billion.

The presently issued guidelines setting future concentration limits which will be tolerated in wastewaters for a number of the heavy metals indicate that the technologies now available for removal of these heavy metal ions may not be adequate to meet the future limitations. A critical evaluation of the pollution potential of heavy metals in effluents indicates that antimony, cadmium, chromium, copper, lead, mercury, selenium, silver, tin and zinc are to be classified as possessing extreme pollution potential; whereas barium, bismuth, iron, manganese, molybdenum, titanium and uranium are to be classified as possessing high pollution potential. Of these, it is believed that new technologies may be required for removing at least copper, lead, zinc, cadmium, selenium, arsenic and mercury to meet proposed toxicity standards.

The recovery of the heavy metals from some industrial processes may offer appreciable economic advantages. For example, the recovery of cobalt and nickel from leach liquors or of copper, lead and zinc from effluents from smelter operations, or of chromium, selenium, cadmium and tin from process effluents, or of other sulfides from the different hydrometallurgical processes may result in material savings. The selective reprocessing of electroplating solutions is another example of an industrial process in which heavy metals recovery may be desirably practiced.

In present day practice, gross levels of heavy metals are reduced by biological treatments by removal along with the sludge either through sorption or precipitation as hydroxides; by chemical treatment with lime to form hydroxides; by mixed media filtration after lime treatment or carbonation; or by adsorption if organic adsorbates are present. Among the techniques which are known or proposed, but not widely used, for the removal of trace amounts of the heavy metals are foam separation, ion exchange, chelation, electrolysis, and reaction with various agents including hydrogen sulfide gas. Although these techniques are known, none has been adapted to the handling of very large volumes of aqueous liquid to effectively, reliably and economically remove trace amounts of the heavy metals. This is particularly true in the case of the use of hydrogen sulfide which has long been known to form insoluble metal sulfides within controlled pH ranges which vary from metal to metal. Thus, although the heavy metal sulfides are extremely insoluble, the driving forces involved in their formation are so high that the resulting precipitates are very small in size and often colloidal in nature, a fact which means that there is little if any particulate growth. This in turn means that the precipitated heavy metal sulfides, once formed, cannot be easily removed by settling and filtration. Inasmuch as either the treatment of wastewaters or of metallurgical process streams normally involves the processing of very large volumes of liquid, it is almost mandatory, from an economic point of view, that solids separation and removal be accomplished by techniques, e.g., settling and filtering, which are applicable to large liquid volumes. This in turn dictates the necessity for converting the heavy metals to insoluble compounds which are of a nature that enables them to be removed as magma for subsequent settling and filtration. The method and apparatus of this invention make this possible even when large volumes of aqueous liquids containing relatively low concentrations of heavy metal must be processed.

It is therefore a primary object of this invention to provide a method of treating an aqueous liquid with hydrogen sulfide to precipitate one or more heavy metal sulfides in a form (i.e., with a particle size distribution) which permits subsequent separation of the sulfides formed by settling and filtration. It is another object to provide a method of the character described which is applicable to the treating of very large volumes of water such as waste effluent waters, metallurgical leach liquors and the like. It is yet an additional object to provide an effective method for removing heavy metals from aqueous liquids wherein the metals are present in minute concentrations.

Other objects of the invention will in part be obvious and will in part be apparent hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a generalized plot showing the rates of crystal growth and nucleation as functions of degree of supersaturation and the use by the method and apparatus of this invention of these rates;

Figure 1:
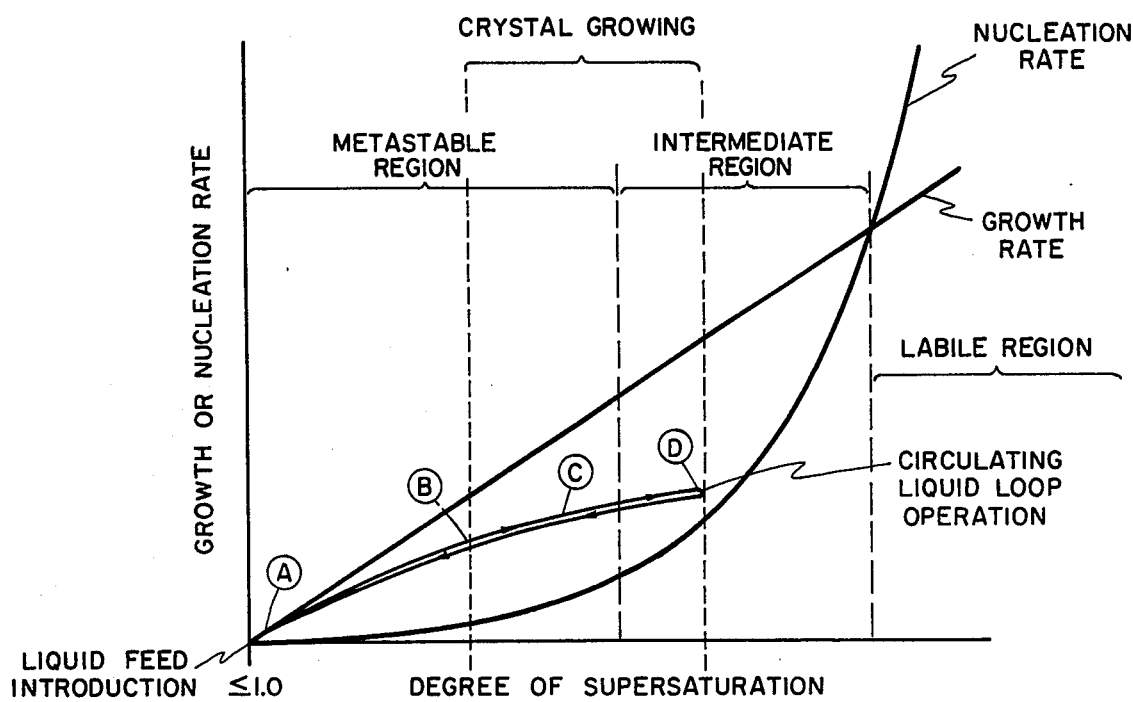

According to one aspect of this invention there is provided a method for processing an aqueous feed liquid to precipitate at least one metal sulfide in a form to make the sulfide subsequently removable from the stream by settling and filtration, comprising the steps of circulating within a loop a volume of an aqueous liquid containing a soluble salt of the metal to be removed and establishing within the loop in order of liquid flow at least one mixing zone, a controlled precipitation initiating zone, a crystal growing zone, and a crystal settling zone; introducing upstream from the mixing zone aqueous liquid to be processed, the aqueous liquid containing an excess of $H_2S$ dissolved therein and having a pH less than that at which the sulfide of the metal precipitates; introducing into the mixing zone an aqueous pH-adjusting liquid in a quantity sufficient to raise the pH of the liquid in the loop to a point between that at which the liquid becomes slightly supersaturated with respect to the metal sulfide and that at which precipitation of the metal sulfide is initiated; maintaining the degree of supersaturation within the controlled precipitation initiating and crystal growing zones in the metastable condition whereby the growth rate of metal sulfide crystals remains greater than under uncontrolled conditions vis-a-vis the nucleation rate throughout essentially the entire precipitation of the metal sulfide and the metal sulfide formed is of a particle size distribution which permits it to collect in the crystal settling zone and to provide aqueous liquid for recirculation in the loop; and drawing off from the loop the sulfide magma formed in the crystal settling zone; the volume flow of the liquid in the loop being equivalent to the product of volume flow rate of the aqueous liquid introduced into the loop and the residence time of a hypothetical volume of the liquid introduced into the loop.

According to another aspect of this invention there is provided a method for removing from an aqueous feed liquid at least one heavy metal present therein as a soluble salt by reaction with $H_2S$ to form an insoluble metal sulfide, comprising the steps of dissolving in the aqueous feed liquid a quantity of $H_2S$ in excess of that required to react with the heavy metal, the pH of the feed liquid being below that at which the dissolution of the $H_2S$ will cause precipitation; providing a circulating loop of the aqueous liquid and establishing within the loop in order of liquid flow at least one mixing zone, a controlled precipitation initiating zone, a crystal growing zone, and a crystal settling zone; introducing into the loop upstream from the mixing zone the aqueous liquid containing $H_2S$ dissolved therein; introducing into the mixing zone an aqueous pH-adjusting liquid in a quantity sufficient to raise the pH of the liquid in the loop to a point between that at which the liquid becomes slightly supersaturated with respect to the metal sulfide and that at which precipitation of the metal sulfide is initiated; maintaining the degree of supersaturation within the controlled precipitation initiating and crystal growing zones in the metastable condition whereby the growth rate of metal sulfide crystals remains greater than under uncontrolled conditions vis-a-vis the nucleation rate throughout essentially the entire precipitations of the metal sulfide and the metal sulfide formed is of a particle size distribution which permits it to collect in the crystal settling zone and to provide aqueous liquid for recirculation in the loop; drawing off from the loop the metal sulfide magma formed in the crystal settling zone; and removing the metal sulfide from the magma by clarifying and filtration to provide an aqueous liquid from which the heavy metal is removed.

According to a further aspect of this invention there is provided an apparatus for processing an aqueous feed liquid to precipitate at least one metal sulfide in a form to make the sulfide subsequently removable from the stream by settling and filtration, comprising, in combination, means defining a circulating liquid loop having in order of liquid flow at least one mixing zone, a controlled precipitation initiating zone, a crystal growing zone, and a crystal settling zone; means upstream from the mixing zone for introducing into the loop aqueous liquid to be processed, the aqueous liquid containing an excess of $H_2S$ dissolved therein and having a pH less than that at which the sulfide of the metal precipitates; means for introducing into the mixing zone an aqueous pH-adjusting liquid in a quantity sufficient to raise the pH of the liquid in the loop to a point between that at which the liquid becomes slightly supersaturated with respect to the metal sulfide and that at which precipitation of the metal sulfide is initiated; means for maintaining the degree of supersaturation within the controlled precipitation initiating and crystal growing zones in the metastable condition whereby the growth rate of metal sulfide crystals remains greater than under uncontrolled conditions vis-a-vis the nucleation rate throughout essentially the entire precipitation of the metal sulfide and the metal sulfide formed is of a particle size distribution which permits it to collect in the crystal settling zone and to provide aqueous liquid for recirculation in the loop; means for drawing off from the loop the metal sulfide magma formed in the crystal settling zone; and means for circulating the liquid within the loop.

According to yet another aspect of this invention there is provided apparatus for removing from an aqueous feed liquid at least one heavy metal present therein as a soluble salt by reaction with $H_2S$ to form an insoluble metal sulfide, comprising in combination means to dissolve in the aqueous feed liquid a predetermined quantity of $H_2S$; means defining a circulating liquid loop having in order of liquid flow at least one mixing zone, a controlled precipitation initiating zone, a crystal growing zone, and a crystal settling zone; means upstream from the mixing zone for introducing into the loop the aqueous liquid containing $H_2S$ dissolved therein and having a pH less than that at which the sulfide of the metal precipitates; means for introducing into the mixing zone an aqueous pH-adjusting liquid in a quantity sufficient to raise the pH of said liquid in the loop to a point between that at which the liquid becomes slightly supersaturated with respect to the metal sulfide and that at which precipitation of the metal sulfide is initiated; means for maintaining the degree of supersaturation within the controlled precipitation initiating and crystal growing zones in the metastable condition whereby the growth rate of metal sulfide crystals remains greater than under uncontrolled conditions vis-a-vis the nucleation rate throughout essentially the entire precipitation of the metal sulfide and the metal sulfide formed is of a particle size distribution which permits it to collect in the crystal settling zone and to provide aqueous liquid for recirculation in the loop; means for drawing off from the loop the metal sulfide magma formed in the crystal settling zone; means for circulating the liquid within the loop including means for maintaining the volume flow of the liquid in the loop essentially equivalent to the product of volume flow rate of the aqueous liquid introduced into the loop and the resident time of a hypothetical volume of the liquid introduced into said loop; and clarification/filtration means for separating the metal sulfide from the magma thereby to provide an aqueous liquid from which the heavy metal is removed.

It has long been known that the heavy metal sulfides are readily precipitated out of aqueous solutions and that such precipitation occurs at a pH which is characteristic of the sulfide formed. The order in which the heavy metal sulfides are precipitated by increasing pH is: $As_2S_5$, HgS, CuS, $Sb_2S_3$, $Bi_2S_3$, $SnS_2$, CdS, PS, SnS, ZnS, CoS, NiS, FeS and MnS. Although this knowledge has long been applied to standard procedures of qualitative analysis, it has in and of itself little use in the treatment of large volumes of liquid from which the resulting sulfides must be removed by an economically acceptable technique.

The precipitation reactions which give rise to the formation of the heavy metal sulfides comprise three basic steps: achievement of supersaturation, formation of nucleii and growth of nucleii. As illustrated in FIG. 1, nucleation and growth rates are controlled by the degree of supersaturation, which is defined as the ratio of actual concentration of the metal ions in solution to the normal equilibrium concentration of the metal ions in pure solvent. Ideally, a removal process such as that sought to remove the heavy metals from wastewaters or process streams, would be a stepwise procedure; but nucleation cannot be eliminated and must therefore be dealt with. FIG. 1 shows that the growth rate increases linearly with supersaturation whereas the nucleation rate increases exponentially. FIG. 1 also shows that there are three regions of supersaturation, namely the metastable wherein growth is highly significant; the intermediate wherein nucleation becomes a factor but growth remains significant; and the labile region wherein nucleation predominates.

The need to form reasonably large crystals is dictated by the need for being able to settle out and filter off the sulfides; and this in turn means that the amount of nucleation must be controlled and minimized and the amount of crystal growth must be maximized. This can be accomplished by the control of supersaturation, which in turn can be controlled by the rate of change of the pH of the liquid. Since the solubility of the metal sulfides of interest is quite low, the rate of increase of supersaturation is normally extremely rapid; but we have found that by using what is hereinafter referred to as a circulating supersaturated liquid loop, by controlling the rate of pH change, and by operating the loop within the metastable region and, if desired, into the intermediate region as shown in FIG. 1, it is possible to control the rate of supersaturation to the extent that crystal growth is much greater than under uncontrolled conditions vis-a-vis nucleation.

The method of this invention may be first explained with reference to FIGS. 1 and 2. The hydrogen sulfide gas used to react with the soluble metal salts (usually sulfates and/or chlorides) in the aqueous liquid feed is introduced and dissolved in the feed liquid in excess of that amount required to react with all of the metal ions to be removed. Since pH is crucial to the control of the method, the pH of the aqueous feed liquid when it enters the circulating liquid loop must be below that at which precipitation can be initiated. In the case of those metal sulfides, e.g., $SnS_2$ and CdS, which form under slightly acidic conditions, it may be necessary to lower the pH, by adding to the feed liquid an appropriate amount of an acid, e.g., sulfuric or hydrochloric acid, to that level at which precipitation is not initiated in the feed liquid. In the case of the metal sulfides, e.g., $As_2S_5$, HgS and CuS, which form even under very acidic conditions it will be necessary to add to the feed liquid a soluble salt of a metal, e.g., iron or manganese, the sulfide of which is soluble within the pH range of the feed liquid. In this case the added hydrogen sulfide preferentially reacts with the added metal ions to form soluble sulfides rather than with the metal ion or ions to be removed. With the subsequent raising of the pH, the sulfide ions are controllably released from the soluble sulfides to form insoluble sulfides having the desired particle size distribution characteristics.

The quantity of liquid circulating in the loop, once its full circulating flow is established, is kept essentially constant, which means that it is maintained equal to the aqueous liquid feed rate multiplied by the residence time of any selected hypothetical liquid volume (e.g., a gallon) in the loop. Thus, for example, if the aqueous liquid feed rate is 100 gallons per minute (gpm), the mean residence time required to attain the desired particle size distribution is 70 minutes and one gpm of pH-adjusting liquid is introduced, there will be some 7070 gallons circulating in the loop with the withdrawal of 101 gpm of magma containing the precipitated sulfides. The residence time in the loop for the hypothetical volume may be up to two or three hours. It may, however, be as short as a few minutes, e.g., about 15 or 30.

Figure 2:
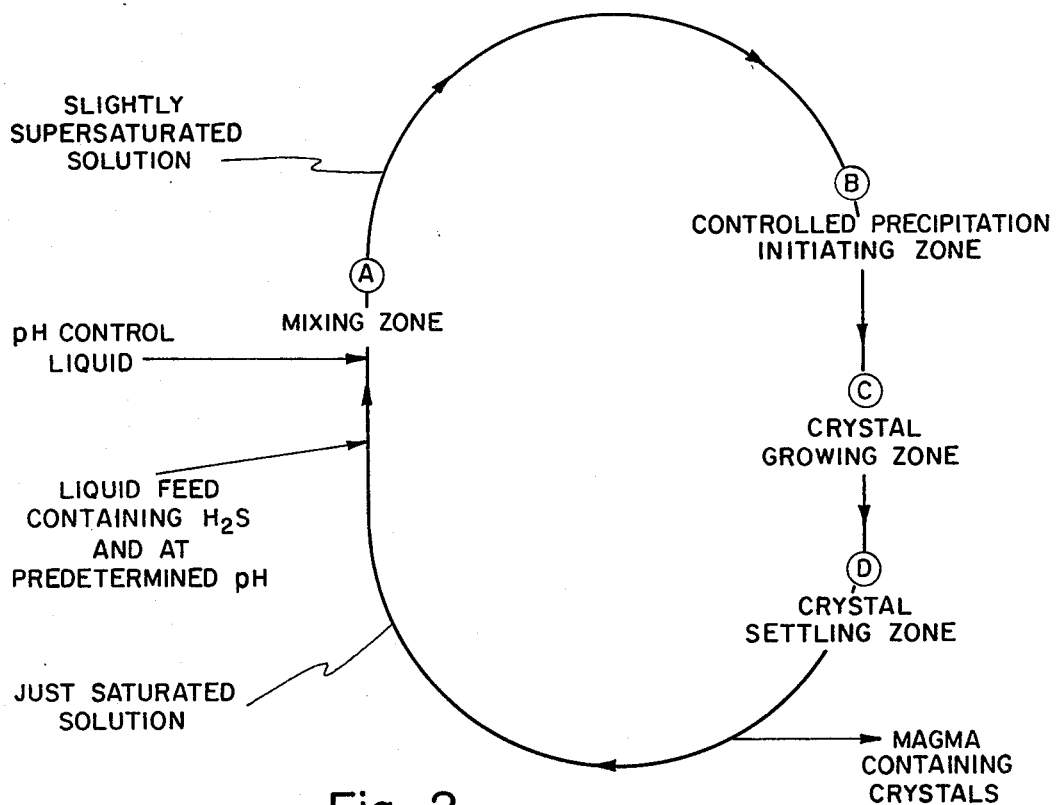
FIG. 2 is a diagrammatic representation of the circulating liquid loop which is maintained in the method and apparatus of this invention.

The liquid feed containing $H_2S$ and at a predetermined pH is then introduced into the circulating liquid loop as will be seen in the diagram of FIG. 2. The liquid circulating in the loop at the point of liquid feed introduction is characterized as having a degree of supersaturation no greater than and preferably somewhat less than one. Subsequent to the introduction of the liquid feed into the loop, the pH-adjusting liquid is introduced and there is established in the loop a mixing zone, designated by the letter Ⓐ in all of the drawing. The character (pH) and amount of pH-adjusting liquid is such as to raise the pH of the liquid in the loop to the point where some supersaturation is attained but below that at which any appreciable nucleation sets in. Thus, as will be seen from FIG. 1, the purpose of the pH-adjusting liquid is that of beginning the supersaturation process; and the amount of liquid in the loop is sufficiently large so that this can be done without undesirable nucleation. The pH-adjusting liquid must be capable of raising the pH of the aqueous feed liquid; and it is typically an alkaline material such as lime, soda ash or an hydroxide of an alkali metal (e.g., sodium or potassium) or of an alkaline earth (e.g., calcium) or ammonium hydroxide. Generally, the milder alkalis such as a water slurry of lime are preferred since they make it somewhat easier to adjust and control the pH and hence the degree of supersaturation.

The next zone in the liquid loop may be termed the controlled precipitation initiating zone designated Ⓑ in the drawings. In this zone the liquid, the pH of which has been controllably raised, comes in contact with liquid, the degree of supersaturation of which is such as to provide crystal growth with limited nucleation. As the liquid continues to move through the loop its degree of supersaturation decreases by virtue of the continued removal of precipitated sulfides so that in the crystal growing zone Ⓒ and crystal settling zone Ⓓ the degree of supersaturation in the loop is reduced and ultimately reaches its lowest value. With the settling of the crystals in zone Ⓓ and vacuum removal of excess $H_2S$ gas (if necessary) the degree of supersaturation of the liquid in the loop gradually decreases as it completes its circulation so that it returns to the point of liquid feed in essentially the just-saturated condition.

Figure 3:
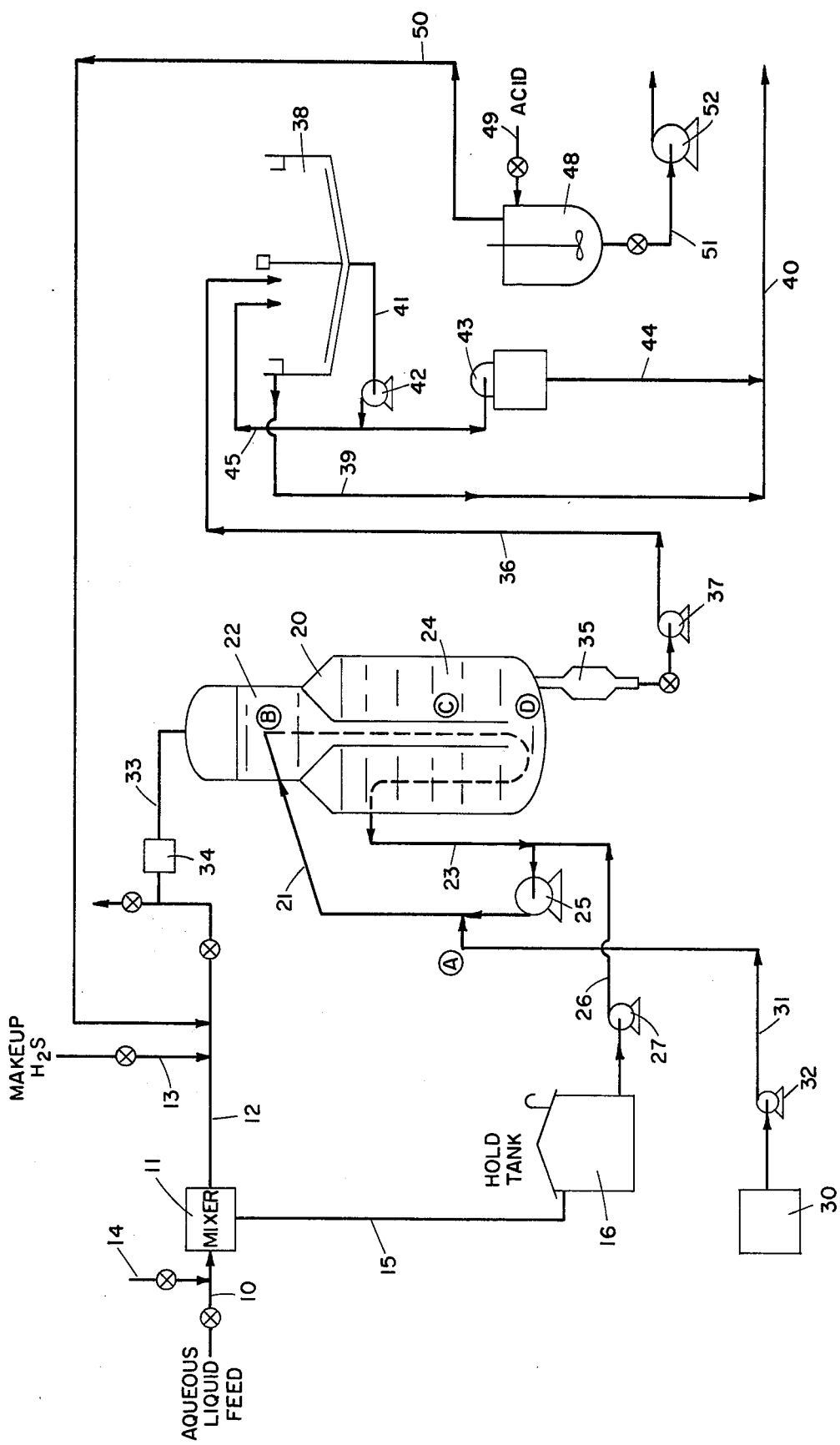
FIG. 3 is a diagram of a complete system constructed in accordance with this invention incorporating one embodiment of a circulating liquid loop.
Figure 4:
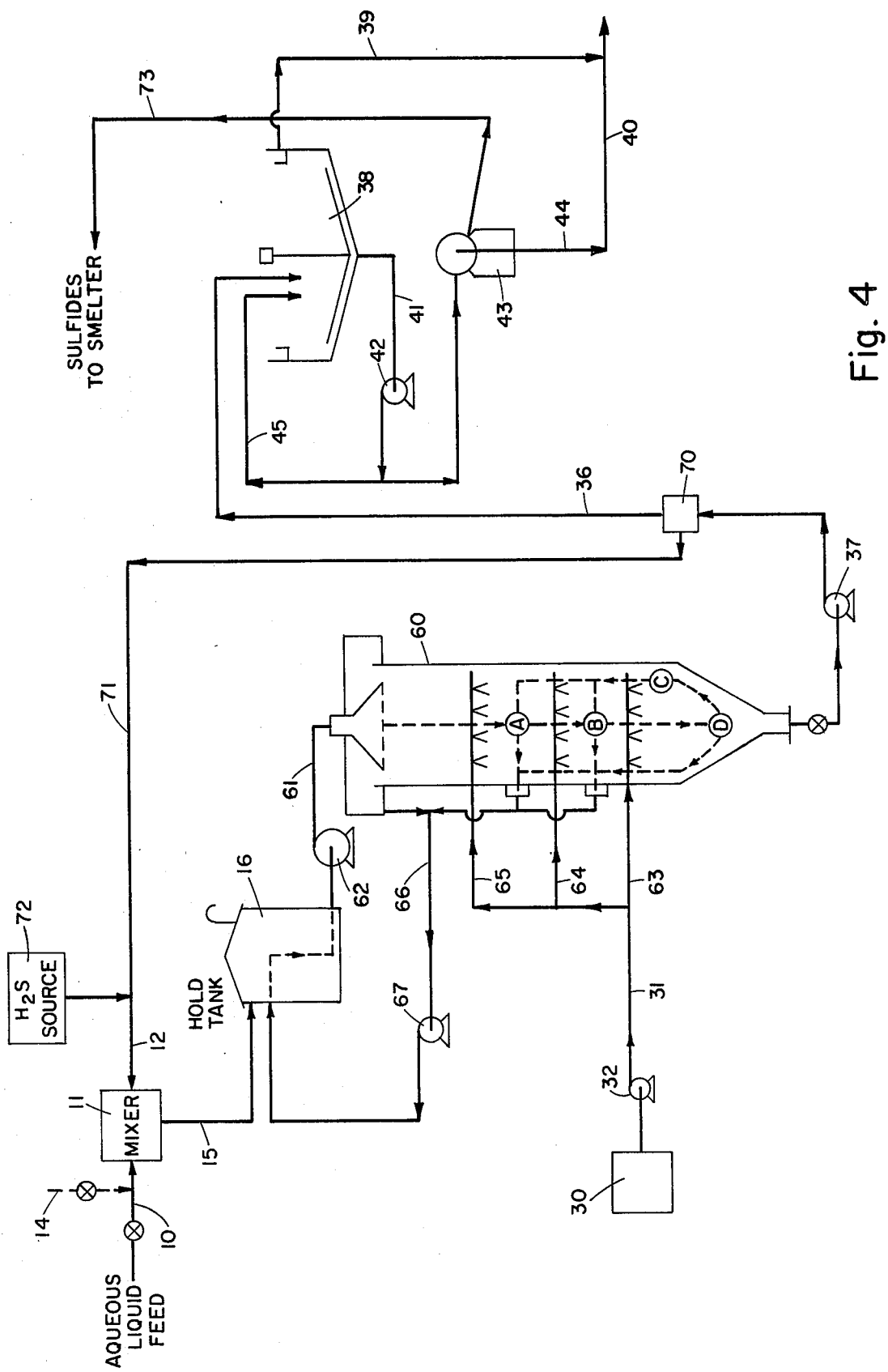
FIG. 4 is a diagram of a complete system constructed in accordance with this invention incorporating another embodiment of a circulating liquid loop.

FIGS. 3 and 4 illustrate two embodiments of the apparatus of this invention, the apparatus of FIG. 3 providing for a single introduction of pH control liquid and that of FIG. 4 for multiple introductions.

In the apparatus diagrammed in FIG. 3 the aqueous liquid feed containing the metal or metals to be removed is introduced into the system through a valve-controlled line 10 into a mixer 11 which may be an on-line mixer. Since, as will be described below, a large portion of the hydrogen sulfide used is recovered and introduced into mixer 11 through line 12, it is only necessary to supply makeup $H_2S$ gas through line 13. If an acidifying agent, e.g., sulfuric or hydrochloric acid, or a solution of a rate-controlling additive, e.g., a soluble iron or manganese salt, is to be added, this is done through line 14. From mixer 11 the aqueous feed liquid containing $H_2S$ and at the desired pH (with additional salts if required) is carried through line 15 to a hold tank 16 from which the feed liquid is taken for introduction into the circulating liquid loop.

Although the method and apparatus of this invention are described in terms of using $H_2S$ as the reactant to furnish the sulfide ions required, it is, of course, within the scope of this invention to use any suitable water-soluble sulfide salt, e.g., sodium or potassium sulfide for this purpose.

The circulating liquid loop in the apparatus of FIG. 3 will be seen to be comprised of a reaction crystallizer 20, a liquid line 21 arranged to discharge liquid into the upper mixing and reaction section 22 of crystallizer 20, a liquid line 23 arranged to draw off liquid from the upper level of the crystallizing section 24 of crystallizer 20, and pump 25.

The aqueous liquid feed is pumped from hold tank 16 through line 26 by pump 27 to line 23 forming a section of the loop. The pH controlling liquid, contained in reservoir 30 is pumped through line 31 by pump 32 into the mixing zone A. This mixing zone is in line 21 forming another section of the circulating liquid loop. Although no attempt is made in FIG. 3 to draw the pumps 25, 27 and 32 to scale, it will be seen that pump 25 which is used to effect circulation of the liquid in the loop is, by necessity, capable of pumping a much larger volume than pump 27 used to provide the feed liquid. Finally, the volume of pH-adjusting liquid is very small compared to the loop volume.

Excess $H_2S$ is drawn off reaction section 22 of the crystallizer 20 through line 33 by means of vacuum system 34.

The reaction section 22 of crystallizer 20 provides that portion of the liquid loop serving as controlled precipitation initiating zone Ⓑ; whereas the central portion and the bottom portion of the crystallizing section 24 of vessel 20 provide those portions of the liquid loop serving as the crystal growing zone Ⓒ and crystal settling zone Ⓓ, respectively. Associated with the crystal settling zone is an elutriation leg 35 into which the magma containing the sulfide crystal is discharged. The magma is pumped through line 36 by pump 37 into a clarifier 38 where settling occurs. The resulting clarified liquid is drawn off the top of clarifier 38 through line 39 which carries it to a purified effluent line 40 for discharge into an appropriate reservoir, e.g., a flowing stream. A major portion of the concentrated slurry from clarifier 38 is pumped through line 41 by pump 42 into a filter 43 from which the filtrate is carried through line 44 to effluent line 40. a minor portion of concentrated slurry is returned by way of line 45 to clarifier 38.

The clarifier/filter combination and its associated pumps, etc., are constructed and assembled according to well-established engineering practice; and a plurality of such clarifier/filter combinations may be used to handle large volumes of liquid.

In the apparatus embodiment of FIG. 3, the $H_2S$ is recovered for reuse. This is done by transferring the sulfides from filter 43 into a reaction vessel 48 into which dilute sulfuric acid is introduced through line 49. The $H_2S$ generated in the reaction is returned via line 50 into $H_2S$ feed line 12 along, if desired, with any $H_2S$ recovered by the vacuum system 34. The solution of metal sulfate or sulfates formed in reactor 48 is discharged by way of line 51 and pump 52 to an appropriate point of disposal which may include one or more further reactions to convert the metal to an environmentally acceptable material.

In the apparatus embodiment shown in FIG. 4, wherein the same reference numerals are used to identify the same components as in FIG. 3, a wash column 60 is used in place of the reaction crystallizer in the circulating liquid loop, and the hold-tank 16 is incorporated into the loop. The entire liquid loop volume including the aqueous feed volume is therefore pumped through line 61 by pump 62 into the top of wash column 60. The liquid in traveling downward through column 60 is contacted by the pH-adjusting liquid at multiple levels, three levels being illustrated in FIG. 4. The pH-adjusting liquid is pumped into the column through lines 63, 64 and 65.

As will be seen from FIG. 4, the mixing zone Ⓐ is established within the first area of contact between the feed liquid and pH-adjusting liquid, the controlled precipitation initiating zone Ⓑ in the area where additional pH-adjusting liquid is added, the crystal growing zone Ⓒ in the lower portion of the column, and the crystal settling zone Ⓓ in the bottom of the column. The dotted lines within the column 60 and hold tank 16 represent the general direction in which the liquid flows in the loop. It will be seen that the loop liquid is drawn off column 60 at two levels and recirculated via line 66 and recirculation pump 67 to hold tank 16. Any overflow from column 60 is also recirculated via line 66.

If a vacuum system 70 is used to withdraw excess $H_2S$, it is located in line 36 carrying the magma from column 60 to clarifier 38. This $H_2S$ is directed through line 71 to be added to the $H_2S$ from primary source 72 for introduction from feed line 12 into mixer 11. FIG. 4 illustrates the use of the method and apparatus of this invention in cleaning up a process stream from a smelter in which case the metal sulfides recovered in filter 43 are returned via line 73 directly to the smelter. It is, of course, within the scope of this invention to use the reaction crystallizer arrangement of FIG. 3 with the sulfide handling technique of FIG. 4 or to use the sulfide handling technique of FIG. 3 with the wash column arrangement of FIG. 4. If a soluble metal sulfide is used in place of $H_2S$, it is also, of course, possible to recycle the sulfide values and to recover the metal values in any suitable manner.

Illustrative of the method of this invention is the treatment of an aqueous liquid containing 100 ppm copper in solution. Since precipitation of the copper sulfide will begin at a pH of 4.4 the pH of the aqueous feed should be adjusted to be between about 3.5 and 4 at the time the $H_2S$ is introduced. Using a feed rate of 100 gpm of the aqueous liquid into the loop and a slow controlled introduction of a strong lime slurry (1 to 5 gmp) the pH of the loop liquid will be gradually raised to 4.4 and then to about 8 to provide the necessary conditions to remove essentially all of the copper as copper sulfide.

The method and apparatus of this invention make it possible to economically remove relatively small amounts of heavy metal values from aqueous liquids using hydrogen sulfide to precipitate metal sulfides. The method and apparatus are, moreover, particularly suited to the processing of large volumes of liquid.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A method for processing an aqueous feed liquid to precipitate at least one metal sulfide in a form to make said sulfide subsequently removable from said stream by settling and filtration, comprising the steps of
   (a) circulating within a loop a volume of an aqueous liquid containing a soluble salt of the metal to be removed and establishing within said loop in order of liquid flow
      at least one mixing zone,
      a controlled precipitation initiating zone,
      a crystal growing zone, and
      a crystal settling zone;
   (b) introducing into said loop upstream from said mixing zone aqueous feed liquid to be processed, said aqueous liquid containing $H_2S$, in excess of that required to react with said metal, dissolved therein and having a pH less than that at which the sulfide of said metal precipitates;
   (c) introducing into said mixing zone an aqueous pH-adjusting liquid in a quantity sufficient to raise the pH of said liquid in said loop to a point between that at which said liquid becomes slightly supersaturated with respect to said metal sulfide and that at which precipitation of said metal sulfide is initiated;
   (d) maintaining the degree of supersaturation within said controlled precipitation initiating and crystal growing zones in the metastable condition whereby the growth rate of metal sulfide crystals remains greater than under uncontrolled conditions vis-a-vis the nucleation rate throughout essentially the entire precipitation of sai metal sulfide and said metal sulfide formed is of a particle size distribution which permits it to collect in said crystal settling zone and to provide aqueous liquid for recirculation in said loop; and
   (e) drawing off from said loop the the metal sulfide magma formed in said crystal settling zone; the volume flow of said liquid in said loop being essentially equivalent to the product of volume flow rate of said aqueous liquid introduced into said loop and the residence time of a hypothetical volume of said liquid introduced into said loop.

2. A method in accordance with claim 1 wherein said loop incorporates a reaction crystallizer and said controlled precipitation initiating zone is located in the reacting section of said reaction crystallizer and said crystal growing and said crystal settling zones are located in the crystallizing section of said reaction crystallizer.

3. A method in accordance with claim 1 wherein said loop incorporates a wash column into which said pH-adjusting liquid is introduced for countercurrent contact with said liquid in said loop.

4. A method in accordance with claim 3 wherein said step of introducing said feed liquid into said loop comprises pumping said feed liquid into a hold tank which forms part of said loop and said step of circulating said liquid within said loop includes returning liquid from said wash column to said hold tank.

5. A method for removing from an aqueous feed liquid at least one heavy metal present therein as a soluble salt by reaction with $H_2S$ to form an insoluble metal sulfide, comprising the steps of
   (a) dissolving in said aqueous feed liquid a quantity of $H_2S$ in excess of that required to react with said heavy metal, the pH of said feed liquid being below that at which the dissolution of said $H_2S$ will cause precipitation;
   (b) providing a circulating loop of said aqueous liquid and establishing within said loop in order of liquid flow
      at least one mixing zone,
      a controlled precipitation initiating zone,
      a crystal growing zone, and
      a crystal settling zone;
   (c) introducing into said loop upstream from said mixing zone, said aqueous liquid containing $H_2S$ dissolved therein;
   (d) introducing into said mixing zone an aqueous pH adjusting liquid in a quantity sufficient to raise the pH of said liquid in said loop to a point between that at which said liquid becomes slightly supersaturated with respect to said metal sulfide and that at which precipitation of said metal sulfide is initiated;
   (e) maintaining the degree of supersaturation within the controlled precipitation initiating and crystal growing zones in the metastable condition whereby the growth rate of metal sulfide crystals remains greater than under uncontrolled conditions vis-a-vis the nucleation rate throughout essentially the entire precipitation of said metal sulfide and the metal sulfide formed is of a particle size distribution which permits it to collect in said crystal settling zone and to provide aqueous liquid for recirculation in said loop;
   (f) drawing from said loop the metal sulfide magma formed in said crystal settling zone; and
   (g) removing said metal sulfide from said magma by clarifying and filtration to provide an aqueous liquid from which said heavy metal is removed.

6. A method in accordance with claim 5 including the step of adding an acid to said aqueous feed liquid to adjust the pH thereof prior to said dissolving said $H_2S$ in said feed liquid.

7. A method in accordance with claim 5 including the step of adding to said aqueous feed liquid prior to said dissolving of said $H_2S$ therein a solution of an acid salt of a second metal the sulfide of which is precipitated only under alkaline conditions whereby said second metal forms soluble sulfides which release sulfides ions in the controlled precipitation initiation and crystal growing zones to precipitate said heavy metal sulfide in a manner to maintain said metastable condition.

8. A method in accordance with claim 5 wherein said loop incorporates a reaction crystallizer and said controlled precipitation initiating zone is located in the reacting section of said reaction crystallizer and said crystal growing and said crystal settling zones are located in the crystallizing section of said reaction crystallizer.

9. A method in accordance with claim 5 wherein said loop incorporates a wash column into which said pH-adjusting liquid is introduced for countercurrent contact with said liquid in said loop.

10. A method in accordance with claim 9 wherein said step of introducing said feed liquid into said loop comprises pumping said feed liquid into a hold tank which forms part of said loop and said step of circulating said liquid within said loop includes returning liquid from said wash column to said hold tank.

11. A method in accordance with claim 5 including the steps of reacting said metal sulfide removed in step (g) with an acid to regenerate $H_2S$ and recycling said regenerated $H_2S$ for use in step (a).

12. A method in accordance with claim 5 wherein said pH-adjusting liquid comprises a mildly alkaline liquid.

* * * * *